VAN DER VEER WILLING.
AUTOMOBILE SIGNALING DEVICE.
APPLICATION FILED NOV. 26, 1913.
1,164,045.
Patented Dec. 14, 1915
2 SHEETS—SHEET 1.
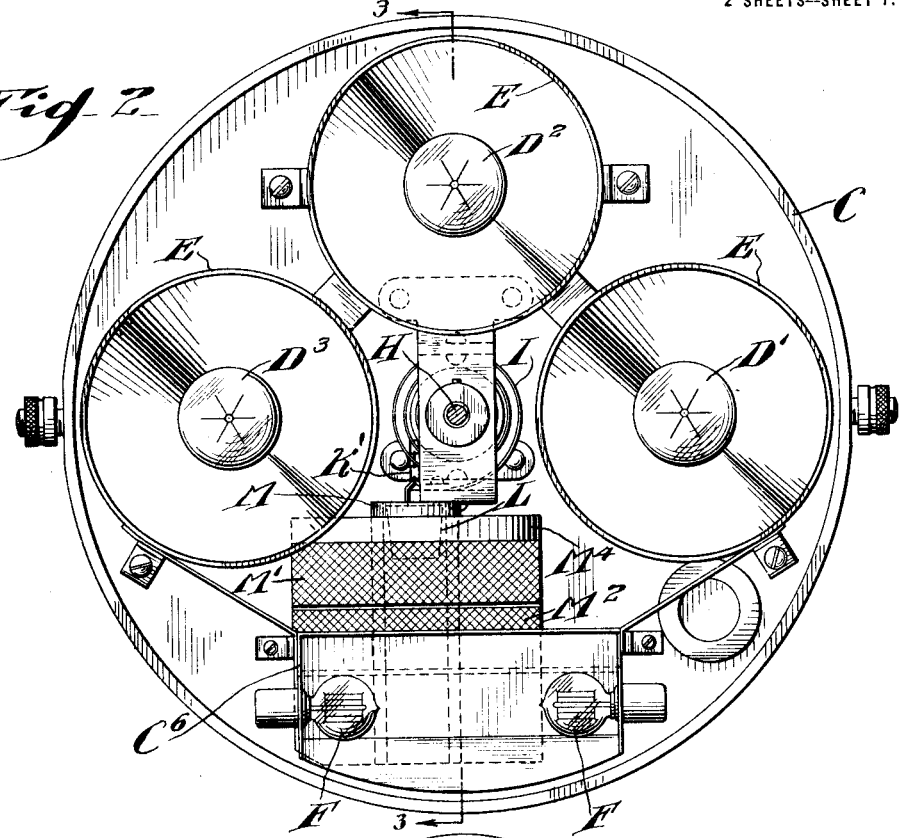
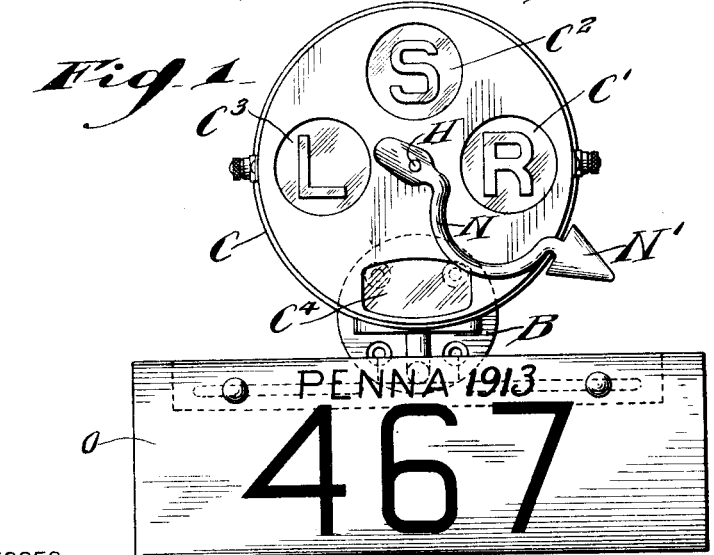
INVENTOR
WITNESSES
BY
ATTORNEY VAN DER VEER WILLING.
AUTOMOBILE SIGNALING DEVICE.
APPLICATION FILED NOV. 26, 1913.
1,164,045.
Patented Dec. 14, 1915.
2 SHEETS—SHEET 2.
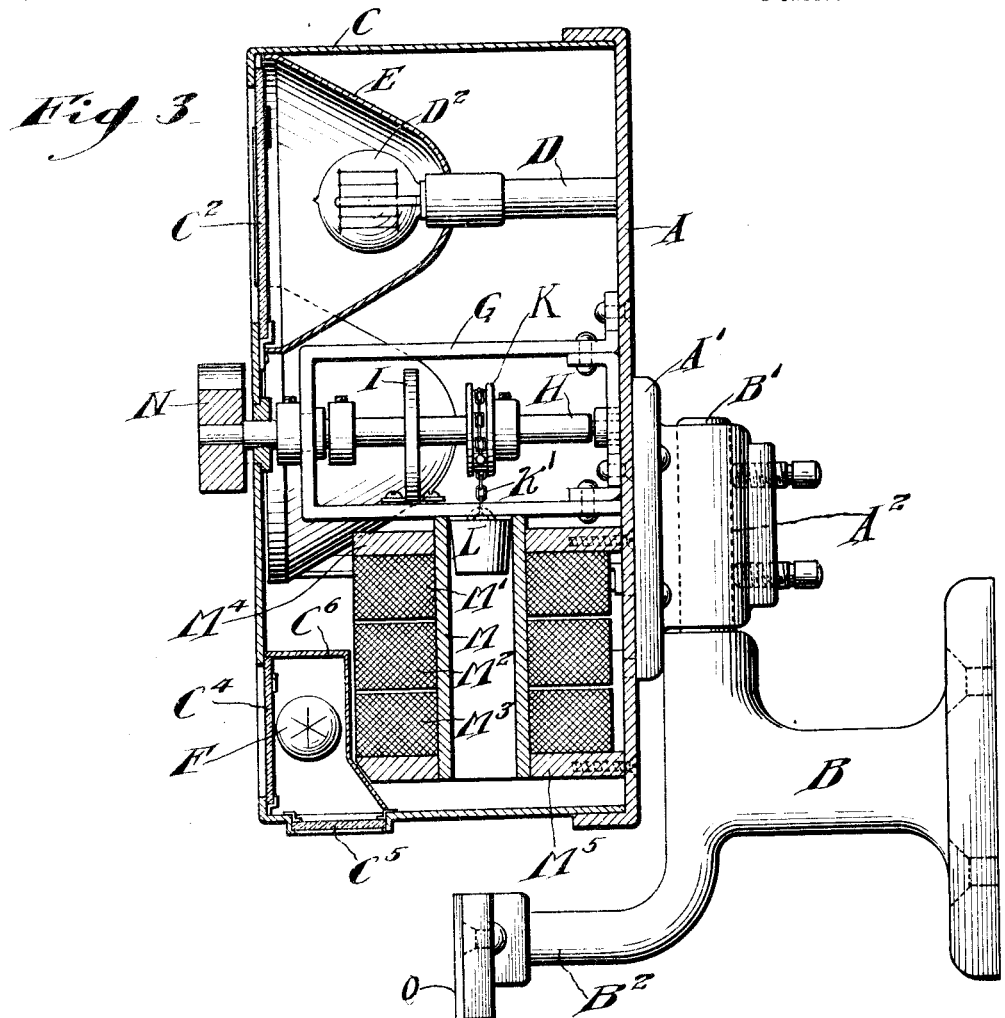
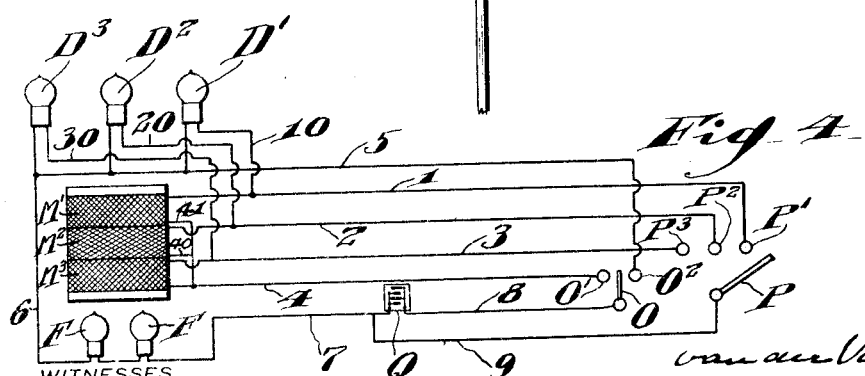

UNITED STATES PATENT OFFICE.

VAN DER VEER WILLING, OF PHILADELPHIA, PENNSYLVANIA.

AUTOMOBILE SIGNALING DEVICE.

1,164,045.  Specification of Letters Patent.  Patented Dec. 14, 1915.

Application filed November 26, 1913. Serial No. 803,119.

*To all whom it may concern:*

Be it known that I, VAN DER VEER WILLING, a citizen of the United States of America, residing in the city and county of Philadelphia, State of Pennsylvania, have invented certain new and useful Improvements in Automobile Signaling Devices, of which the following is a true and exact description, reference being had to the accompanying drawings, which form a part thereof.

My present invention consists in an improved signaling device, adapted for use in displaying different signals at the will of the operator, and especially devised for use on an automobile or other vehicle to signal an intention to turn the vehicle carrying it, to the right, or to the left, or to stop the vehicle.

The general object of the invention is to provide simple and effective apparatus for the purpose specified.

More specifically, the object of my invention is to provide simple and effective means whereby through simple manipulations of electric circuit controlling means, different surfaces may be illuminated to display a set of signals at night, and other signaling means may be actuated without illuminating said surfaces to display a corresponding set of signals in the daylight.

The various features of novelty which characterize my invention are pointed out with particularity in the claim annexed to and forming a part of this specification. For a better understanding of the invention, however, and of the advantages possessed by it, reference should be had to the accompanying drawings and descriptive matter in which I have illustrated and described a preferred form in which my invention may be embodied:

Of the drawings:

Figure 1 is an elevation of my improved signaling device; Fig. 2 is an elevation taken similarly to Fig. 1, but on a larger scale and with parts removed; Fig. 3 is a section on the line 3—3 of Fig. 2; and Fig. 4 is a diagram of the circuit connections employed.

In the drawings, A represents the base of the instrument or signaling device proper, especially devised and adapted for attachment to the rear of an automobile. As shown, the base A which is vertically disposed is provided at its front side with a bracket A' in which is formed a socket $A^2$ receiving a stud B' carried by a bracket B attached to the automobile. The bracket B is also formed with an arm $B^2$ carrying the usual license tag O. The signaling device proper comprises a casing or cover member C adapted to be detachably secured to the base A. The casing member C is formed on its end face, as shown, with three circular windows, C', $C^2$ and $C^3$, and with a fourth window $C^4$. Back of the windows C', $C^2$ and $C^3$ are located electric lamps D', $D^2$ and $D^3$, respectively, each carried by a post D, projecting from the base A. Each post D also supports a reflector E, which surrounds the corresponding lamp and engages the front wall of the casing member C at the margin of the corresponding window. As shown in Fig. 1, the windows C', $C^2$ and $C^3$ bear the letters R, S and L, respectively, and are employed to indicate an intention to turn the automobile or other vehicle carrying the device to the right, or to stop it, or to turn it to the left, according to which of these windows is illuminated. The window $C^4$ is in practice made of red glass and with the electric lamps F behind it serves as the usual tail light of the vehicle. The lamps F also serve to illuminate the tag O through the window $C^5$.

The base A has secured to it at its center a bracket G provided with a bearing for a shaft H which projects through the end face of the casing member C and externally of the latter carries an arm M which may be moved by the rotation of the shaft H into registration with one or another of the windows C', $C^2$ or $C^3$, and in conjunction with the latter may thereby serve to convey the same information in the daylight without illumination of the windows, which is furnished at night by the illumination of the windows. A spiral spring I, attached at one end to the shaft H, and at the other end to the bracket G, tends to hold the shaft in such position that the arm M is not in registry with any of the windows C', $C^2$ and $C^3$, as shown in Fig. 1. To turn the shaft H from this neutral position and thereby bring the arm M into coöperative relation with one or another of the windows C', $C^2$ and $C^3$, a wheel K is secured to the shaft H. A flexible element K', shown as a chain, is secured at one end to the wheel K, which it partially encircles in the neutral position of the shaft H. The other end of the chain is attached to a piece of magnetic material L, serving as the armature for the solenoid formed by the superimposed windings M', M² and M³. These windings are coiled about a tubular member N of non-magnetic material, which forms a guide for the armature L. The windings M', M² and M³ are held between end members M⁴ and M⁵ secured to the base A. The operating means for the shaft H are so arranged that when none of the windings M', M² and M³ are energized, the arm N will occupy the position shown in Fig. 1, in which its head N' is not in register with any of the windows C', C² and C³. When the winding M' is energized, the armature L will be drawn down far enough to bring the head N' of the arm N into register with the window C'. Similarly, when the winding M² or the winding M³ is energized, the head of the arm N will be moved into register with the window C² or C³, respectively.

In the convenient and effective circuit and switch arrangement diagrammatically illustrated in Fig. 4, simple provisions are made for exciting the windings M', M² and M³ as desired, without illuminating any of the lamps, and for utilizing the source of current employed for the energization of the windings M', M² and M³ to continuously illuminate the lamps F and to intermittently illuminate one or another of the lamps D', D² and D³ as desired, without exciting the windings M', M² and M³. To excite the windings M', M² and M³, without illuminating the lamps, the switch O is moved into the position in which it engages the switch contact O'. This connects one side of a suitable source of electric current, conventionally illustrated as a storage battery Q, through the conductor 8, switch O, contact O', conductor 4, and branch conductors 40 and 41, to one terminal of each of the three windings M', M² and M³. The other terminals of the windings M', M² and M³ are connected by conductors 1, 2 and 3, respectively, to switch contacts P', P² and P³, respectively. A switch P adapted to be moved into engagement with any one of the three switch contacts P', P² or P³ as desired, is connected by a conductor 9 to the opposite side of the battery Q from that to which the conductor 8 is connected. When the switch P engages the contact P', the winding M' is energized, and similarly when the switch engages the contact P² or P³, the winding M² or M³, respectively, is energized. It will be observed in swinging the switch P from the neutral position, which is that shown in Fig. 4, into engagement with the switch contact P³, the switch will pass over the contacts P' and P² and thus momentarily energize the windings M' and M². This facilitates the movement of the armature L into its lowermost position when the winding M³ is energized, but in practice the winding M³ and the armature L are so relatively arranged and proportioned that the armature would be pulled into its lowermost position whenever the winding M³ is energized regardless of any preceding energization of the windings M' and M²; and, similarly, the winding M² will, when energized, move the armature L into the proper position regardless of whether or not the winding M' was energized immediately previously.

When the signals are to be displayed by the illumination of the lamps, instead of by the movement of the arm N, the switch O is moved into engagement with the switch contact O². In this condition the conductor 3, and the corresponding terminals of the windings M', M² and M³ are disconnected from the battery Q, but the latter is connected through the conductor 8, switch O, contact O² and conductor 5 to one terminal of each of the lamps D', D² and D³. The second terminals of the lamps D', D² and D³ are connected by conductors 10, 20 and 30, respectively, to the conductors 1, 2 and 3. In consequence, by manipulating the switch P, one or another of the lamps D', D² or D³ will be illuminated when the switch blade O is in engagement with the contact O², just as the windings M', M² and M³ would be energized on a corresponding manipulation of the switch P, if the switch O were in engagement with the contact O'. So long as the switch O is in engagement with the contact O² the lamps F will receive current from the battery Q to the circuit including the conductors 5, 6, 7 and 8, regardless of the position of the switch P. The switches O and P may be secured to the dash of the automobile to which the invention is applied, or otherwise so mounted as to be readily accessible for operation. In practice it will be understood that any one of a number of forms of electric switches now in commercial use may be employed as the switch O or the switch P.

While in accordance with the provisions of the statutes I have illustrated and described the best form of my invention now known to me, it will be apparent to those skilled in the art that changes may be made in the form of apparatus disclosed without departing from the spirit of my invention, and that under some conditions certain features of my invention may be used without a corresponding use of other features.

Having now described my invention, what I claim as new and desire to secure by Letters Patent, is:

An automobile signaling device comprising a movable display part, electromagnetic means for moving said part into different positions whereby a set of signals may be displayed in daytime, said electromagnetic means comprising a solenoid divided into separately energizable sections, and a short magnetic armature core axially movable in said solenoid and connected to said part, a plurality of illuminable display surfaces, electric lighting means for separately illuminating said surfaces whereby a corresponding set of signals may be displayed at night, a switch mechanism for rendering either of said means operative and the other inoperative at will, a second switch mechanism operable to adjust said electric lighting means to illuminate one or another of said surfaces, or to energize one or another of said solenoid sections to shift said display part into one or another of its different positions, according to the position of the said first mentioned switch mechanism.

VAN DER VEER WILLING.

Witnesses:
 ARNOLD KATZ,
 D. STEWART.